(12) United States Patent
Daneshgari

(10) Patent No.: US 8,794,259 B2
(45) Date of Patent: Aug. 5, 2014

(54) MODULAR CONTAINER AND FUEL SUPPLY SYSTEM

(76) Inventor: Parviz Daneshgari, Flint, MI (US)

( * ) Notice: Subject to any disclaimer, the term of this patent is extended or adjusted under 35 U.S.C. 154(b) by 236 days.

(21) Appl. No.: 13/139,941

(22) PCT Filed: Feb. 2, 2010

(86) PCT No.: PCT/US2010/022813
§ 371 (c)(1), (2), (4) Date: Jun. 15, 2011

(87) PCT Pub. No.: WO2010/090981
PCT Pub. Date: Aug. 12, 2010

(65) Prior Publication Data
US 2011/0247709 A1    Oct. 13, 2011

Related U.S. Application Data

(60) Provisional application No. 61/149,489, filed on Feb. 3, 2009.

(51) Int. Cl.
*B65D 88/02* (2006.01)

(52) U.S. Cl.
USPC ............ 137/263; 137/265; 137/571; 137/576

(58) Field of Classification Search
USPC .......... 137/265, 266, 267, 263, 571, 572, 576
See application file for complete search history.

(56) References Cited

U.S. PATENT DOCUMENTS

| 3,254,697 | A | * | 6/1966 | Parks | 137/265 |
| 3,913,606 | A | * | 10/1975 | Anderson, Jr. | 137/563 |
| 5,052,443 | A | * | 10/1991 | Evangelist, Jr. | 137/899 |
| 5,417,239 | A | * | 5/1995 | Ford | 137/571 |
| 5,636,654 | A | * | 6/1997 | Helm | 137/265 |
| 5,797,269 | A | | 8/1998 | Nishimura et al. | |

(Continued)

FOREIGN PATENT DOCUMENTS

| CN | 1608883 A | 4/2005 |
| CN | 2763110 Y | 3/2006 |

(Continued)

OTHER PUBLICATIONS

Notice of Reasons for Rejection regarding Japanese Patent Application No. 2011-549,207, dated Dec. 25, 2012. English translation provided by Kanzaki Patent Office.

(Continued)

*Primary Examiner* — Kevin Lee
(74) *Attorney, Agent, or Firm* — Harness, Dickey & Pierce, P.L.C.

(57) ABSTRACT

A fuel system for a vehicle is provided and may include a first housing containing a supply of fuel therein, a second housing containing a supply of fuel therein and coupled to the first housing, and a fuel pump disposed within one of the first housing and the second housing that selectively pumps fuel from each of the first housing and the second housing to the vehicle. A first interface may be associated with one of the first housing and the second housing and may be coupled to a vehicle interface of the vehicle in a coupled state to supply the vehicle with fuel from at least one of the first housing and the second housing.

18 Claims, 3 Drawing Sheets

(56) References Cited

U.S. PATENT DOCUMENTS

| | | | | |
|---|---|---|---|---|
| 5,960,513 | A | * | 10/1999 | Beshah ................. 15/257.01 |
| 6,227,230 | B1 | * | 5/2001 | Huh ........................ 137/265 |
| 6,883,536 | B2 | * | 4/2005 | Hervio et al. ............ 137/259 |
| 2006/0032532 | A1 | | 2/2006 | Suess et al. |

FOREIGN PATENT DOCUMENTS

| | | |
|---|---|---|
| CN | 201059234 Y | 5/2008 |
| EP | 1060936 A2 | 12/2000 |
| JP | 50-17615 | 6/1973 |
| JP | 62-16518 | 1/1987 |
| JP | 6-55944 | 3/1994 |
| JP | 6-170216 | 6/1994 |
| JP | 07-108909 A | 4/1995 |
| JP | 11-82850 | 3/1999 |
| JP | 2002-202012 | 7/2002 |
| JP | 2003-54559 | 2/2003 |
| JP | 2005-126042 A | 5/2005 |
| JP | 2005-139625 | 6/2005 |
| JP | 2006-049032 A | 2/2006 |
| JP | 2006-160078 A | 6/2006 |
| JP | 2006-299972 | 11/2006 |
| JP | 2007-176289 | 7/2007 |
| JP | 2008-18913 | 1/2008 |
| JP | 4715058 B2 | 7/2011 |
| WO | WO-2008-123543 A1 | 10/2008 |

OTHER PUBLICATIONS

International Search Report and Written Opinion for International Application No. PCT/US2010/022813, dated Sep. 28, 2010.
Extended European Search Report regarding Application No. EP 10 73 9006, dated Jul. 2, 2013.
First Office Action regarding Chinese Patent Application No. 201080010388.3, dated Mar. 4, 2013, and Search Report. English translation provided by Unitalen Attorneys at Law.
Second Office Action in Chinese Application No. 201080010388.3, dated Oct. 22, 2013, and Search Report. English translation provided by Unitalen Attorneys at Law.
Notice of Reasons for Rejection regarding Japanese Patent Application No. 2011-549,207, dated Oct. 15, 2013. English translation provided by Kanzaki Patent Office.

* cited by examiner

MODULAR CONTAINER AND FUEL SUPPLY SYSTEM

CROSS REFERENCE TO RELATED APPLICATIONS

This application claims the benefit of U.S. Provisional Application No. 61/149,489, filed on Feb. 3, 2009. The disclosure of the above application is incorporated herein by reference.

FIELD

The present disclosure relates to a modular container for containing and dispensing fuel and to a method of fuel distribution.

BACKGROUND

This section provides background information related to the present disclosure which is not necessarily prior art.

Modern vehicles typically include an engine that requires a supply of fuel to operate and propel the vehicle. This supply of fuel is typically stored in a fuel tank that is permanently attached to the vehicle and can be replenished as needed at a gas station, for example. While modern vehicles typically utilize some form of an evaporative emission control system, fuel vapor containing volatile organic compounds is often released to the atmosphere during refueling of the fuel tank either at a gas station or from a conventional gas can having an aperture open to the atmosphere. Moreover, when filling portable gas cans or vehicles that do not utilize an evaporative emission control system, even more fuel and/or fuel vapor is at risk of being released to the atmosphere.

SUMMARY

This section provides a general summary of the disclosure, and is not a comprehensive disclosure of its full scope or all of its features.

A fuel system for a vehicle is provided and may include a first housing containing a supply of fuel therein, a second housing containing a supply of fuel therein and coupled to the first housing, and a fuel pump disposed within one of the first housing and the second housing that selectively pumps fuel from each of the first housing and the second housing to the vehicle. A first interface may be associated with one of the first housing and the second housing and may be coupled to a vehicle interface of the vehicle in a coupled state to supply the vehicle with fuel from at least one of the first housing and the second housing.

A fuel system for a vehicle is provided and may include a first housing containing a supply of fuel therein and a second housing containing a supply of fuel therein. The second housing may be removably attached to the first housing to selectively permit transfer of fuel between the first housing and the second housing. A first interface may be associated with one of the first housing and the second housing and may be coupled to a vehicle interface of the vehicle in a coupled state to supply the vehicle with fuel from the first housing and the second housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
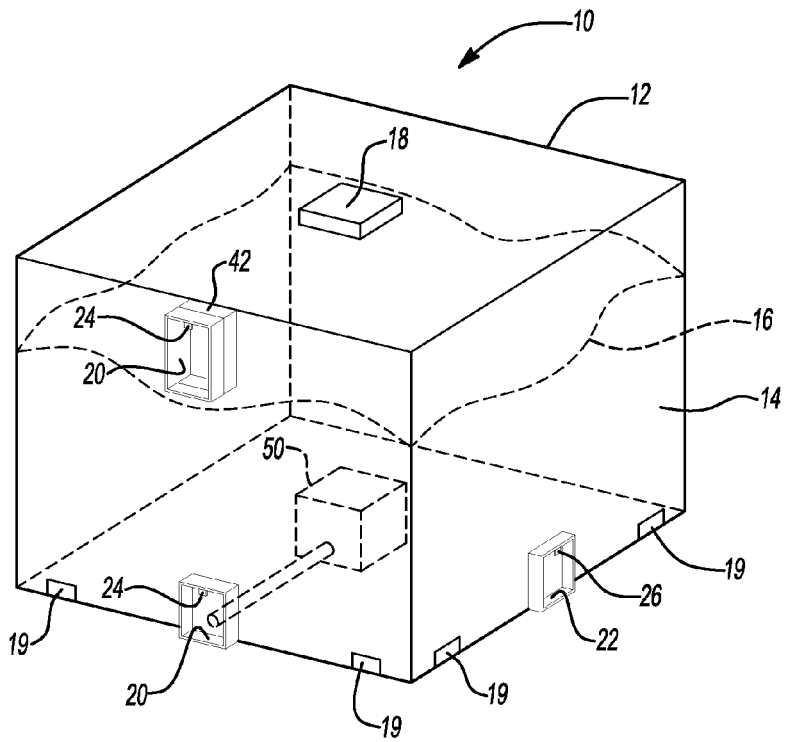
FIG. 1 is a perspective view of a modular energy tank or container according to the principles of the present disclosure.
Figure 2:
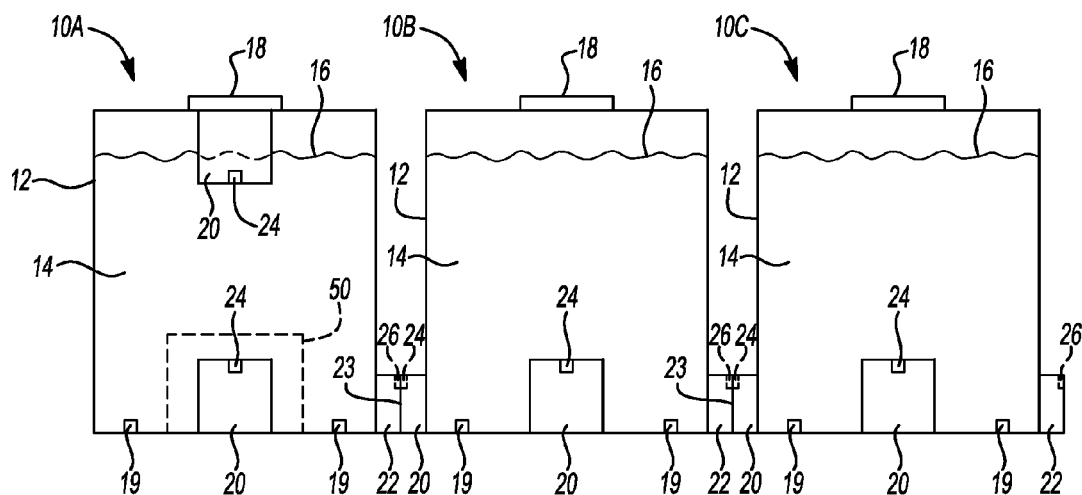
FIG. 2 is an illustration of multiple modular containers coupled together according to the principles of the present disclosure.

Referring to FIGS. 1 and 2, a modular energy tank or container 10 including a housing 12 that defines an internal cavity 14 for holding a source of energy 16 is provided. The energy source 16 may include any solid, liquid or liquefiable energy source including, but not limited to, gasoline, biodegradable gasoline, diesel fuel and liquid natural gas. While it is contemplated that the modular container 10 may be used with any solid, liquid or liquefiable energy source 16 as described above, the modular energy container 10 will be described hereinafter with the energy source being a fluid 16. The housing 12 may be formed from a biodegradable plastic material and may be constructed such that the housing 12 is hermetically sealed. Alternatively, different materials may be used to form housing 12 taking into consideration the intended application and environment in which modular container 10 would be used.

Housing 12 may also be provided in different shapes and/or sizes to accommodate various users that may have different packaging and/or capacity requirements for modular container 10. To assist in handling modular container 10, housing 12 may also include a handle 18 that may be integrally formed with housing 12. While handle 18 is shown in FIG. 1 on a top surface of housing 12, handle 18 could be positioned in various locations on housing 12, as may be required for a particular application of modular container 10.

Attachment mechanisms 19 may also be provided with modular container 10. Attachment mechanisms 19 may be integrally formed with housing 12 and located so as to facilitate securing housing 12 to an adjacent object or structure. If multiple modular containers 10 are coupled together, as will be subsequently described in more detail, attachment mechanisms 19 may also be used to secure one modular container 10 to another so as to prevent any potential relative movement between the coupled modular containers 10.

An interface 20 may be associated with housing 12 and may be used to attach one modular container 10 to another. In one configuration, interface 20 may cooperate with a mating interface 22 such that multiple modular containers 10 are coupled to one another but are not in fluid communication with one another. Such a configuration allows multiple modular containers 10 to be attached to one another for transport within a vehicle and/or from a manufacturer to a distributor without communicating fluid between the respective modular containers 10.

In another configuration, interface 20 may cooperate with interface 22 such then when interfaces 20, 22 are coupled together, the respective modular containers 10 are fluidly coupled in series. Coupling the modular containers 10 in series permits fluid communication between cavities 14 of at least two of the modular containers 10 and, thus, permits transfer of fluid 16 between modular containers 10.

Either or both of the interfaces 20, 22 may include a valve 23 that permits attachment of one modular container 10 to another without permitting fluid communication therebetween in a first state and permits fluid communication therebetween in a second state. Regardless of whether one or both interfaces 20, 22 includes a valve 23, when the respective modular containers 10 are not coupled to one another, interfaces 20, 22 prevent fluid 16 from escaping housing 12 of each modular container 10 to maintain a hermetic seal to prevent any fluid or fluid vapor from escaping. Likewise, when coupled together, interfaces 20 and 22 and any associated valves 23 are in fluid communication with each other while concurrently maintaining a hermetic seal relative to the atmosphere in order to prevent any fluid or fluid vapor from escaping to the atmosphere when flowing through the coupled interfaces 20 and 22.

Interfaces 20 and 22 may also be designed such that they are easily coupled together and selectively decoupled by a user without requiring a tool or other device to facilitate the coupling and decoupling. Interfaces 20 and 22 may also be of a universal nature such that other devices arranged to use fluid 16 could also include an interface arranged to cooperate with interface 20 or 22 so that those devices could easily be coupled in fluid communication with modular container 10.

A locking mechanism 24 may be associated with one of the interfaces 20, 22 and a corresponding locking mechanism 26 may be associated with the other of the interfaces 20, 22. Locking mechanism 24 may engage locking mechanism 26 to secure the interfaces 20, 22 together in a coupled state. The locking mechanisms 24, 26 may be a quick-connect/disconnect coupling that allows for easy coupling and decoupling of the interfaces 20, 22. While FIGS. 1 and 2 illustrate several interfaces 20 and 22 positioned in various locations on housing 12, the number and location of interfaces 20 and 22 can be varied to suit a particular application of modular container 10.

With reference to FIG. 2, a view of three modular containers 10, illustrated as 10A, 10B and 10C, respectively, are shown coupled together. Modular container 10 may be coupled to as many additional modular containers 10 as may be necessary to provide a desired volume of fuel required for a particular application. In this example, modular container 10A is coupled to modular container 10B using interfaces 22 and 20, respectively. For example, locking mechanism 26 of modular container 10A may engage locking mechanism 24 of modular container 10B to secure interface 24 to interface 22. Likewise, modular container 10B may be coupled to modular container 10C using another pair of interfaces 22 and 20, whereby locking mechanism 26 of modular container 10B engages locking mechanism 24 of modular container 10C, as described above. In this configuration, modular container 10A is in fluid communication with modular container 10B, which is in fluid communication with modular container 10C. If modular containers 10A-10C each have a five-gallon capacity, when the modular containers 10A-10C are coupled together in fluid communication (FIG. 2), there is a total of fifteen gallons of container capacity.

Interfaces 20, 22 may be disposed proximate to a bottom of each housing 12 to allow gravity to transfer fluid amongst each container 10A, 10B, 10C. Positioning interfaces 20, 22 proximate to the bottom of each container 10A, 10B, 10C permits fuel 16 disposed within each container 10A, 10B, 10C to be distributed amongst the containers 10A, 10B, 10C, as the fuel 16 is consumed by a vehicle 30, for example. Specifically, if container 10A is attached to a vehicle interface that couples to either of interfaces 20, 22, fuel 16 is first supplied via container 10A. Once the fuel reaches a predetermined level, gravity acts on the fuel disposed within container 10B to replenish the fuel 16 depleted from container 10A. The fuel transferred from container 10B to 10A is then replenished by fuel 16 from container 10C. Once all or most of the fuel 16 is consumed from each of containers 10A, 10B, 10C, the containers 10A, 10B, 10C can be refilled or replaced.

Figure 3:
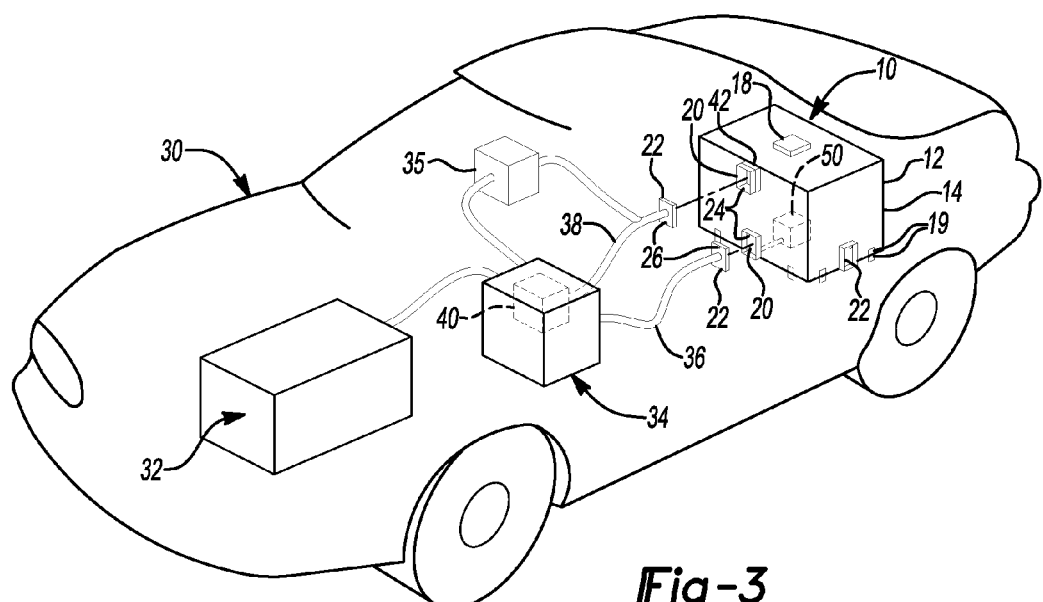
FIG. 3 is a partial perspective view of a vehicle coupled to the modular container of FIG. 1 according to the principles of the present disclosure.
Figure 4:
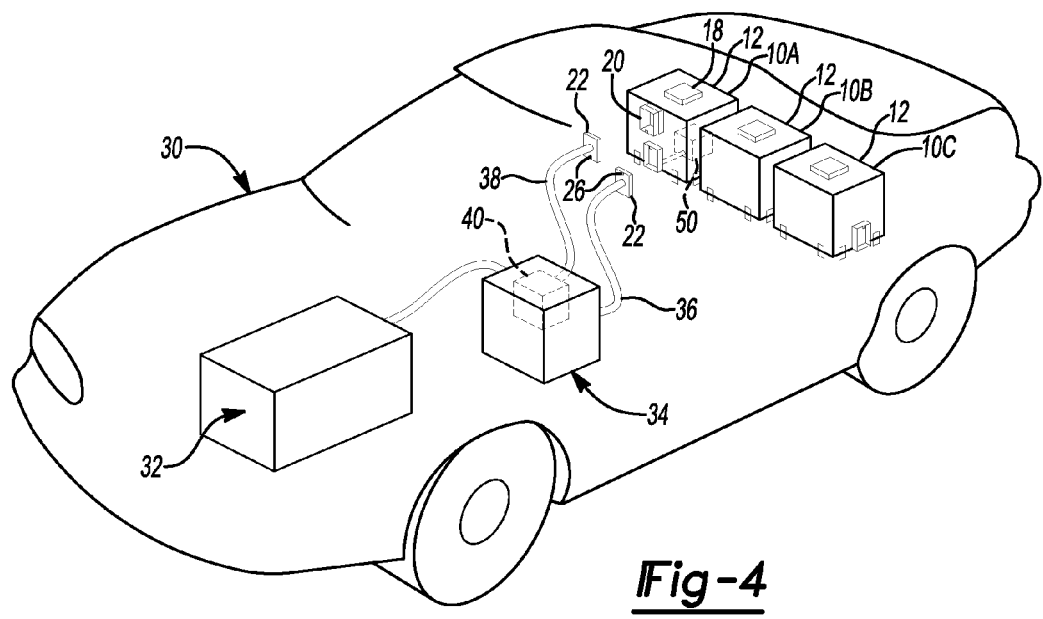
FIG. 4 is a perspective view of multiple modular containers coupled together and to a vehicle according to the principles of the present disclosure.

With additional reference to FIGS. 3 and 4, modular container 10 is shown interfacing with vehicle 30 to provide fuel 16 to an engine 32. Engine 32 may include various propulsion systems arranged to propel a vehicle, including but not limited to, a gasoline engine, a diesel engine or a hybrid configuration having a gasoline or diesel engine in combination with an electric motor. In this exemplary configuration, fluid 16 contained in modular container 10 would be gasoline suitable for gasoline engine 32, and modular container 10 would replace a conventional fuel tank (not shown) of a vehicle. While the modular container 10 will be described and shown hereinafter as being associated with an automotive vehicle 30, the modular container 10 could be used with any mobile platform such as, for example, a bus, train, aircraft, boat or motorcycle.

Modular container 10 carrying a supply of fuel 16 could be placed in vehicle 30, as shown in FIG. 3. Modular container 10 may be secured to vehicle 30 using attachment mechanisms 19 to retain modular container 10 securely in place while positioned in vehicle 30. Modular container 10 may also be coupled to a fuel system 34, which is in fluid communication with engine 32 of vehicle 30.

System 34 may include a fuel-supply line 36 and a fuel-return line 38. The fuel-return line 38 may be coupled to and in fluid communication with a fuel-return system 40 of fuel system 34. Fuel-supply line 36 and fuel-return line 38 may each include a mating interface 22 with a locking mechanism 26. Mating interface 22 of fuel-supply line 36 may be coupled to interface 20 of housing 12 so as to place cavity 14 in fluid communication with fuel system 34 to deliver fuel 16 from the cavity 14 to engine 32. While fuel-supply line 36 may be coupled to one of several interfaces 20 of housing 12, it may be advantageous to use an interface 20 that is located at or near a bottom of housing 12, as shown in FIG. 2, so that the respective interface 20, 22 stays in fluid communication with fuel 16 as the level of fuel within cavity 14 drops due to consumption by engine 32. Once the interfaces 20, 22 are coupled, locking mechanism 26 engages locking mechanism 24 to secure the interfaces 20, 22 together in a coupled state.

Similarly, interface 22 of fuel-return line 38 may be coupled to an interface 20 of housing 12 to place fuel-return line 38 in fluid communication with cavity 14. Once coupled, locking mechanism 26 engages locking mechanism 24 to secure the respective interfaces 20, 22 together in a coupled state. In this configuration, fuel system 34 cooperates with fuel-return line 38 to return any unused fuel 16, as well as any fuel residue in the system, to housing 12. Fuel-return line 38 may be coupled to one of several interfaces 20 that may be connected to housing 12 and may be positioned at or near a top of housing 12 so as to facilitate ease of return of any unused fuel and/or fuel residues to cavity 14. A one-way valve 42 may also be coupled to the interface 20 of housing 12 for interaction with fuel-return line 38. One-way valve 42 allows fuel 16 to flow from return line 38 into housing 12, but prevents fuel 16 or fuel residue from exiting cavity 14 and entering fuel line 38.

Modular container 10 may also include a fuel pump 50 positioned inside housing 12 and cavity 14 to pump fuel 16 from one of more modular containers 10 and supply fuel 16 from one or more modular containers to the vehicle 30. Fuel pump 50 may be in addition to or replace a conventional fuel pump of the vehicle 30. Fuel pump 50 is in fluid communication with fuel 16 as well as an interface 20 that is coupled to fuel-supply line 36. The modular container 10 including fuel pump 50 may be removably installed in vehicle 30 such that modular container 10 including fuel pump 50 is fluidly coupled to an interface 22 of fuel system 34. The modular container 10 with fuel pump 50, while capable of being removed from vehicle 30 and fuel system 34, may be designed such that modular container 10 with fuel pump 50 remains within vehicle 30 even if modular container 10 with fuel pump 50 does not have fuel within cavity 14. If additional fuel 16 is required, additional modular containers 10 may be connected to modular container 10 having fuel pump 50 disposed therein to provide both modular container 10 and fuel pump 50 with additional fuel 16. Alternatively, when modular container 10 having fuel pump 50 disposed therein is depleted, modular container 10 including fuel pump 50 may be disengaged from fuel system 34 to be refilled or replaced with a modular container 10 and new fuel pump 50. While modular container 10 and fuel pump 50 may be replaced once the fuel 16 disposed therein is depleted, adding additional modular containers 10 to the modular container 10 having fuel pump 50 disposed therein is more economical, as replacement of modular container 10 including fuel pump 50 is likely more expensive than adding additional modular containers 10.

With reference to FIGS. 2 and 4, multiple modular containers 10 may be positioned in vehicle 30 and may be coupled to each other as previously described. FIG. 4 shows a configuration where three modular containers 10, such as modular containers 10A-10C shown in FIG. 2, are coupled together in fluid communication with each other. In this configuration, modular container 10A may interface with fuel-supply line 36 and fuel-return line 38 of vehicle 30. Modular container 10B would be coupled to modular container 10A, and modular container 10C would be coupled to modular container 10B, as previously described in connection with FIG. 2. Depending on the particular vehicle 30, additional or fewer modular containers 10 could be coupled together to supply fuel to vehicle 30.

Coupling modular container 10 to fuel system 34, as described above, may allow for elimination of several features of an evaporative emission control system incorporated into many modern vehicles. For example, modular container 10 obviates the need for a conventional gas tank and, as such, eliminates the need for a fuel vapor recovery system conventionally used during vehicle operation and refueling events. Eliminating such systems reduces the overall cost and complexity of vehicle 30.

Modular container 10 may be integrated into vehicle 30 such that modular container 10 cooperates with fuel system 34 and an evaporative emission control system 35 coupled to fuel system 34 to test the fuel system 34 for leaks. Such testing may involve the evaporative emission control system 35 subjecting fuel system 34, including modular containers 10 that are coupled in fluid communication with fuel system 34, to a vacuum to ensure the system is free of leaks.

Figure 5:
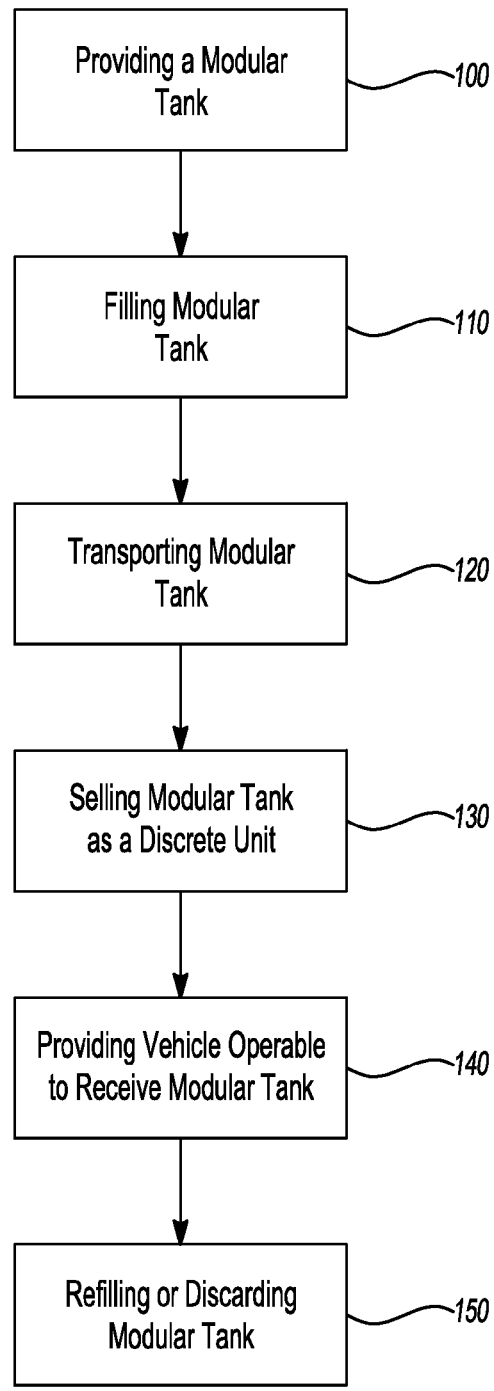
FIG. 5 is a flowchart illustrating a fuel supply method according to the present disclosure.

With reference to FIG. 5, various steps that may be involved in providing and using modular container 10 to supply fuel to a vehicle 30 are shown. Initially, modular container 10 would be manufactured at step 100 taking into consideration end-use requirements such as capacity, packaging space, number of interfaces 20, 22 needed and type of fuel 16 to be housed within cavity 14. Once manufactured, modular container 10 may be tested to validate the integrity of the hermetically sealed housing 12 and interfaces 20, 22.

After testing, modular container 10 may then be filled with a supply of fuel at a refinery, for example, at step 110. The refinery may use an appropriate interface (not shown) that cooperates with an interface 20 or 22 of housing 12 to fill cavity 14 with a supply of fuel 16 while preventing fuel 16 or fuel vapor from escaping to the atmosphere through the coupled interface. Modular container 10 may again be tested to verify the hermetic nature of the housing 12.

Modular containers 10 having a supply of fuel 16 disposed therein may be shipped or transported at step 120 to a location for retail sale. The location may include various retail establishments such as, but not limited to, grocery stores, hardware stores, convenience stores as well as conventional gas stations.

The modular container 10 with a supply of fuel 16 could then be sold as a discrete unit to a purchaser at step 130. Once purchased, modular container 10 with a supply of fuel 16 could then be coupled to a cooperating interface 22 of vehicle 30 at step 140 to provide the vehicle 30 with the supply of fuel 16. When fuel 16 has been largely depleted from cavity 14, modular container 10 can then be decoupled from vehicle 30 and taken to a refilling station for reuse or to a discard station for recycling at step 150, noting that the refilling station and the discard station can be at the same location or at separate locations. While the spent modular container 10 is described as being taken to a discard station, the modular container 10 could be formed from a material that allows the modular container 10 to be recycled along with other household goods.

When modular container 10 is taken to a refilling station, an appropriate interface at the station may be coupled with an interface 20, 22 on housing 12 to refill cavity 14 with a supply of fuel 16. In addition to supplying cavity 14 with a supply of fuel 16, the refilling station may also include other additives or fluids that may be supplied to cavity 14 concurrently with fuel 16 or at a separate time. The other additives may include products including but not limited to, fuel injection cleaner, octane booster and carburetor cleaner.

Once refilled with a supply of fuel 16, modular container 10 may then be recoupled to vehicle 30 either directly to an interface 22 of fuel system 34 or to another modular container 10 that may already be positioned in vehicle 30 and coupled to fuel system 34.

Current equipment and systems used for supplying fuel to gas stations and for filling vehicle gas tanks at gas stations, often result in residual fuel and fuel vapor escaping to the atmosphere. The hermetically sealed modular container 10 and method of use described herein replaces a conventional vehicle gas tank as well as the conventional filling procedures at gas stations, thereby substantially reducing if not eliminating residual fuel and vapor escaping to the atmosphere.

Moreover, while using the modular container 10 has been described herein primarily in connection with a mobile platform such as a vehicle, the modular container 10 can be used to supply fuel to almost any device using an engine that requires fuel, such as a lawnmower, tractor, snow blower, motorcycle, etc., by providing the device with an interface arranged to cooperate with the interface of the modular container 10 interface, as previously described. This will help to further reduce if not eliminate residual fuel and fuel vapor that escapes to the atmosphere when filling or refilling such devices, especially considering that these devices typically do not have any evaporative emission control systems or other systems that mitigate fuel vapor being released to the atmosphere.

The foregoing description of the present disclosure has been provided for purposes of illustration and description. It is not intended to be exhaustive or to limit the invention. Further, the description is merely exemplary in nature and, thus, variations that do not depart from the gist of the disclosure and are intended to be within the scope of the disclosure. Such variations are not intended to depart from the spirit and scope of the disclosure.

What is claimed is:

1. A fuel system for a vehicle, the fuel system comprising:
   a first housing containing a supply of fuel therein and having a first locking mechanism movable between a locked state and an unlocked state;
   a second housing containing a supply of fuel therein and having a second locking mechanism movable between a locked state and an unlocked state, the second housing selectively coupled to the first housing via the first locking mechanism and the second locking mechanism, the second housing coupled to the first housing when the first locking mechanism is in the locked state and the second locking mechanism is in the locked state;
   a fuel pump disposed within the first housing and operable to selectively pump fuel from the first housing and the second housing to the vehicle; and
   a first interface associated with the first housing and operable to be coupled to a vehicle interface of the vehicle in a coupled state to supply the vehicle with fuel from at least one of the first housing and the second housing.

2. The fuel system of claim 1, wherein the second housing includes a third locking mechanism operable between a locked state and an unlocked state, the third locking mechanism operable to attach a third housing containing a supply of fuel therein to the second housing when in the locked state.

3. The fuel system of claim 1, wherein the first housing is in fluid communication with the second housing.

4. The fuel system of claim 1, wherein at least one of the first housing and the second housing includes a valve permitting fluid transfer between the first housing and the second housing in a first state and preventing fluid transfer between the first housing and the second housing in a second state.

5. The fuel system of claim 1, further comprising an attachment mechanism associated with at least one of the first housing and the second housing to secure the housing to the vehicle.

6. The fuel system of claim 1, wherein the first interface supplies fuel to the vehicle from the first housing and the second housing.

7. The fuel system of claim 1, wherein at least one of the first housing and the second housing are hermetically sealed.

8. The fuel system of claim 1, wherein the first housing is in fluid communication with the second housing proximate to a bottom of the first housing and the second housing to allow gravity to transfer fluid between the first housing and the second housing.

9. The fuel system of claim 1, wherein the second housing includes a third locking mechanism operable between a locked state and an unlocked state and located on an opposite side of the second housing than the second locking mechanism, the third locking mechanism operable to attach a third housing containing a supply of fuel therein to the second housing when in the locked state.

10. A fuel system for a vehicle, the fuel system comprising:
    a first housing having a first interface and containing a supply of fuel therein, the first interface including a first locking mechanism operable between a locked state and an unlocked state;
    a second housing having a second interface including a second locking mechanism operable between a locked state and an unlocked state and containing a supply of fuel therein, the second interface removably attached to the first interface by the first locking mechanism and the second locking mechanism when the first locking mechanism is in the locked state and the second locking mechanism is in the locked state to selectively permit transfer of fuel between the first housing and the second housing via the first interface and the second interface;
    a third interface associated with one of the first housing and the second housing and operable to be coupled to a vehicle interface of the vehicle in a coupled state to supply the vehicle with fuel from the first housing and the second housing.

11. The fuel system of claim 10, wherein at least one of the first interface of the first housing and the second interface of the second housing includes a valve operable in a first state to permit fluid communication between the first housing and the second housing and in a second state to prevent fluid communication between the first housing and the second housing.

12. The fuel system of claim 11, wherein the first interface of the first housing is disposed proximate to a bottom portion of the first housing and the second interface of the second housing is disposed proximate to a bottom portion of the second housing to allow gravity to transfer fluid therebetween.

13. The fuel system of claim 10, further comprising an attachment mechanism associated with at least one of the first housing and the second housing to secure the housing to the vehicle.

14. The fuel system of claim 10, wherein at least one of the first housing and the second housing are hermetically sealed.

15. The fuel system of claim 10, further comprising a fuel pump disposed in at least one of the first housing and the second housing.

16. The fuel system of claim 15, wherein the fuel pump draws fluid from the one of the first housing and the second housing to supply fuel to the vehicle when the first interface is in the coupled state.

17. The fuel system of claim 10, wherein at least one of the first housing and the second housing includes a third locking mechanism operable between a locked state and an unlocked state to selectively attach a third housing containing a supply of fuel therein to one of the first housing and the second housing via the third locking mechanism.

18. A fuel system for a vehicle, the fuel system comprising:
    a first housing containing a supply of fuel therein and including a first locking mechanism movable between a locked state and an unlocked state;
    a second housing containing a supply of fuel therein and having a second locking mechanism movable between a locked state and an unlocked state and a third locking mechanism movable between a locked state and an unlocked state, the second housing selectively coupled to the first housing via the first locking mechanism and the second locking mechanism, the second housing coupled to the first housing when the first locking mechanism is in the locked state and the second locking mechanism is in the locked state;
    a third housing containing a supply of fuel therein and having a fourth locking mechanism movable between a locked state and an unlocked state, the third housing selectively coupled to the second housing via the third locking mechanism and the fourth locking mechanism, the third housing coupled to the second housing when the third locking mechanism is in the locked state and the fourth locking mechanism is in the locked state;

a fuel pump disposed in the first housing and operable to draw fuel from the first housing, the second housing, and the third housing;

a first interface associated with one of the first housing and the second housing and operable to be coupled to a vehicle interface of the vehicle in a coupled state to supply the vehicle with fuel from the first housing, the second housing, and the third housing; and an attachment mechanism associated with at least one of the first housing and the second housing to secure the housing to the vehicle.

\* \* \* \* \*